US010039086B2

(12) United States Patent
Baek et al.

(10) Patent No.: US 10,039,086 B2
(45) Date of Patent: Jul. 31, 2018

(54) COMMUNICATION METHOD AND APPARATUS IN NETWORK ENVIRONMENT WHERE TERMINAL MAY HAVE DUAL CONNECTIVITY TO MULTIPLE BASE STATIONS

(71) Applicant: ELECTRONICS AND TELECOMMUNICATIONS RESEARCH INSTITUTE, Daejeon (KR)

(72) Inventors: Seung-Kwon Baek, Daejeon (KR); Jae Young Ahn, Daejeon (KR)

(73) Assignee: ELECTRONICS AND TELECOMMUNICATIONS RESEARCH INSTITUTE, Daejeon (KR)

(*) Notice: Subject to any disclaimer, the term of this patent is extended or adjusted under 35 U.S.C. 154(b) by 663 days.

(21) Appl. No.: 14/538,131

(22) Filed: Nov. 11, 2014

(65) Prior Publication Data
US 2015/0131578 A1 May 14, 2015

(30) Foreign Application Priority Data

Nov. 11, 2013 (KR) .................. 10-2013-0136483
Nov. 26, 2013 (KR) .................. 10-2013-0144919
Jul. 28, 2014 (KR) .................. 10-2014-0095850

(51) Int. Cl.
*H04W 72/04* (2009.01)
*H04B 7/024* (2017.01)

(52) U.S. Cl.
CPC ....... *H04W 72/0406* (2013.01); *H04B 7/024* (2013.01)

(58) Field of Classification Search
CPC .......................... H04W 72/042; H02W 24/10
See application file for complete search history.

(56) References Cited

U.S. PATENT DOCUMENTS

2004/0203623 A1* 10/2004 Wu .................. H04L 1/188
  455/412.1
2011/0065442 A1   3/2011 Kim et al.
2014/0051447 A1* 2/2014 Li ................... H04W 76/028
  455/437

(Continued)

FOREIGN PATENT DOCUMENTS

KR   10-2009-0129326 A   12/2009

OTHER PUBLICATIONS

"3rd Generation Partnership Project; Technical Specification Group Radio Access Network; Scenarios and requirements for small cell enhancements for E-UTRA and E-UTRAN", 3GPP TR 36.932 V12.1.0, Mar. 2013.

(Continued)

*Primary Examiner* — Robert M Morlan
(74) *Attorney, Agent, or Firm* — Rabin & Berdo, P.C.

(57) ABSTRACT

A communication method of a terminal that may have dual connectivity to a first base station and a second base station is provided. The terminal receives a first Radio Resource Control (RRC) message from the first base station only through a first interface between the first base station and the terminal. The terminal transmits a second RRC message to the first base station only through the first interface.

17 Claims, 16 Drawing Sheets

(56) References Cited

U.S. PATENT DOCUMENTS

| | | | | |
|---|---|---|---|---|
| 2014/0092809 A1* | 4/2014 | Guo | ...................... | H04W 40/12 |
| | | | | 370/328 |
| 2014/0362829 A1* | 12/2014 | Kazmi | .................. | H04W 36/22 |
| | | | | 370/332 |
| 2015/0117183 A1* | 4/2015 | Heo | .................. | H04W 36/0055 |
| | | | | 370/228 |

OTHER PUBLICATIONS

"3rd Generation Partnership Project; Technical Specification Group Radio Access Network; Evolved Universal Terrestrial Radio Access (E-UTRA); Study on Small Cell Enhancements for E-UTRA and E-UTRAN—Higher layer aspects", 3GPP TR 36.842 V1.0.0, Nov. 2013.

ETRI, "Discussion on RRC signalling via SeNB", 3GPP TSG-RAN2 Meeting #84, R2-134005, Oct. 11-15, 2013.

* cited by examiner

COMMUNICATION METHOD AND APPARATUS IN NETWORK ENVIRONMENT WHERE TERMINAL MAY HAVE DUAL CONNECTIVITY TO MULTIPLE BASE STATIONS

CROSS-REFERENCE TO RELATED APPLICATION

This application claims priority to and the benefit of Korean Patent Application Nos. 10-2013-0136483, 10-2013-0144919, and 10-2014-0095850 filed in the Korean Intellectual Property Office on Nov. 11, 2013, Nov. 26, 2013, and Jul. 28, 2014, the entire contents of which are incorporated herein by reference.

BACKGROUND OF THE INVENTION (a) Field of the Invention

The present invention relates to a communication method and apparatus in a network environment in which dual connectivity is available.

(b) Description of the Related Art

In 3rd Generation Partnership Project (3GPP) Long Term Evolution (LTE), in an environment in which small cells are densely disposed in a multi-layer in a macro cell-based cellular network, in order to increase capacity of a wireless network through close cooperation between a macro base station and a small base station, standardization work of small cell enhancement technology has been performed. Objects of small cell enhancement technology when discussing 3GPP are to receive sharply increasing traffic, to efficiently manage mobility, and to secure coverage essential for mobile communication by increasing spectrum efficiency per unit area by disposing small cells at a high density. In order to achieve such an object, a 3GPP Radio Access Network (RAN) has been under discussion regarding requirements and a scenario for enhancing a small cell in Evolved-Universal Terrestrial Radio Access (E-UTRA) and an Evolved-Universal Terrestrial Radio Access Network (E-UTRAN). At a RAN conference in December of 2012 a superordinate layer Study Item (SI) and a physical layer for enhancing a small cell were approved.

A 3GPP defined the following three scenarios in consideration of disposition, spectrum, and traffic of a small cell and compatibility with a previous specification in order to improve a small cell of a cellular network. The 3GPP discusses a technical issue and solution for three scenarios. The first scenario is one in which a macro cell and a small cell use the same frequency in a structure in which the macro cell and the small cell are overlapped. The second scenario is one in which a macro cell and a small cell use different frequencies in a structure in which the macro cell and the small cell are overlapped. The third scenario is one in which only small cells are disposed in a structure in which a macro cell and a small cell are not overlapped.

In a cellular network, communication technology that can support the first to third scenarios for enhancing a small cell is needed.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a communication method and apparatus having advantages of supporting enhancement of a small cell.

An exemplary embodiment of the present invention provides a communication method of a terminal that may have dual connectivity to a first base station and a second base station. The communication method includes: receiving a first Radio Resource Control (RRC) message from the first base station only through a first interface between the first base station and the terminal; and transmitting a second RRC message to the first base station only through the first interface.

The terminal may not receive the first RRC message from the second base station.

A user plane protocol of the first base station and a user plane protocol of the second base station may support a bearer split function.

The user plane protocol of the second base station may include remaining protocols, except for a Packet Data Convergence Protocol (PDCP) among the PDCP, a Radio Link Control (RLC) protocol, and a Medium Access Control (MAC) protocol.

The first base station may be a master base station that performs control and service for the terminal, and the second base station may be an auxiliary base station that provides an auxiliary service to the terminal.

The receiving of a first RRC message may include receiving the first RRC message using at least one Signaling Radio Bearer (SRB) that is set through an RRC protocol of the first base station and an RRC protocol of the terminal.

The SRB may include: a first SRB used for transmitting/receiving a message of a Common Control Channel (CCCH) based on a Transparent Mode (TM); and at least one second SRB used for transmitting/receiving a message of a Dedicated Control Channel (DCCH) based on an Acknowledgement Mode (AM).

The communication method may further include measuring a cell of the first base station and a cell of the second base station in response to a measurement instruction that is received from the first base station, before the receiving of a first Radio Resource Control (RRC) message.

The communication method may further include releasing the remaining bearers, except for the first SRB, when a Radio Link Failure (RLF) is recognized.

Another embodiment of the present invention provides a communication method of a terminal that may have dual connectivity to a first base station and a second base station. The communication method includes: receiving a first Radio Resource Control (RRC) message from a base station that is selected according to quality of a first radio link between the first base station and the terminal and quality of a second radio link between the second base station and the terminal among the first base station and the second base station; and transmitting a second RRC message to the selected base station.

The receiving of a first RRC message may include receiving the first RRC message using a first SRB that is set by the second base station.

The first SRB may be the same as a second SRB that is set by the first base station.

The receiving of a first RRC message may include receiving the first RRC message using a first SRB that is set by the second base station.

The first SRB may be different from the second SRB that is set by the first base station.

The communication method may further include: before the receiving of a first RRC message, receiving a measurement instruction from the first base station; measuring a downlink carrier frequency of a cell of at least one of the first base station and the second base station in response to the measurement instruction; and performing measurement in order to search for a cell of the second base station in response to the measurement instruction.

The communication method may further include: before the receiving of a first RRC message, determining whether the measured result corresponds to a report condition that is received from the first base station; and reporting, when the measured result corresponds to the report condition, the measured result to the first base station.

A base station that transmits the first RRC message may be selected based on the measured result.

The communication method may further include releasing both an SRB and a Data Radio Bearer (DRB) that are set by the first base station and the second base station and re-establishing an RRC connection, when a Radio Link Failure (RLF) of the first radio link is recognized.

The communication method may further include transmitting a first message that requests RRC connection re-establishment to the second base station, when an RLF of the first radio link is recognized.

The first message may include re-establishment cause information representing an RLF of a master cell.

The communication method may further include notifying the first base station of an RLF of the second radio link in order to release SRB and DRB that are set for the second base station, when the RLF of the second radio link is recognized.

The communication method may further include releasing both a SRB and a DRB that are configured for the first base station and the second base station when an Radio Link Failure (RLF) of the first radio link and an RLF of the second radio link are recognized and re-establishing a RRC connection.

Yet another embodiment of the present invention provides a communication method of a terminal that may have dual connectivity to a first base station and a second base station. The communication method includes: receiving a first RRC message from the first base station and the second base station; and determining whether the first RRC message is duplicated.

The determining of whether the first RRC message is duplicated may include determining, through an RRC protocol of the terminal using a simultaneous transmission parameter that is included in the first RRC message, whether the first RRC message is duplicated.

The simultaneous transmission parameter may represent that both the first base station and the second base station transmit the first RRC message to the terminal.

The determining of whether the first RRC message is duplicated may include determining, through a PDCP of the terminal, whether the first RRC message is duplicated.

The communication method may further include: before the receiving of a first RRC message, receiving a measurement instruction from the first base station; measuring a downlink carrier frequency of a cell of at least one of the first base station and the second base station in response to the measurement instruction; performing measurement in order to search for a cell of the second base station in response to the measurement instruction; and reporting the measured result to the first base station, when the measured result corresponds to a report condition that is received from the first base station.

Yet another embodiment of the present invention provides a method in which a first base station communicates in a cellular network environment in which dual connectivity is available. The method includes: instructing measurement of a cell of the first base station that is connected to a terminal and measurement of a cell of a second base station to the terminal for dual connectivity of the terminal; and determining a base station to perform RRC signaling of the terminal among the first base station and the second base station based on a measuring result that is received from the terminal.

The method may further include: generating a plurality of RRC messages including a first parameter through an RRC protocol of the first base station, when both the first base station and the second base station are determined as a base station to perform RRC signaling; and transmitting one message of the plurality of RRC messages to the second base station through an interface between the first base station and the second base station.

The first parameter may represent that both the first base station and the second base station transmit the RRC message to the terminal.

The method may further include: generating a plurality of PDCP Protocol Data Units (PDUs) including a first field through a PDCP protocol of the first base station, when both the first base station and the second base station are determined as a base station to perform RRC signaling; and transmitting one PDU of the plurality of PDCP PDUs to the second base station through an interface between the first base station and the second base station.

The first field may represent that both the first base station and the second base station transmit the PDCP PDU to the terminal.

The method may further include transmitting information necessary for configuring a physical layer protocol and a data link layer protocol to the second base station through an interface between the first base station and the second base station.

Yet another embodiment of the present invention provides a method in which an auxiliary base station communicates in a cellular network environment in which a terminal may have dual connectivity to a master base station and the auxiliary base station. The method include: receiving first information necessary for a Signaling Radio Bearer (SRB) configuration through an interface between the master base station and the auxiliary base station; configuring an SRB based on the first information; and transmitting, by only the auxiliary base station or both the auxiliary base station and the master base station, a Radio Resource Control (RRC) message to the terminal using the SRB.

The method may further include: receiving a request for RRC connection re-establishment from the terminal, when a Radio Link Failure (RLF) has occurred in a radio link between the master base station and the terminal; requesting path switch to a Mobility Management Entity (MME) based on the RRC connection re-establishment request; and responding to the RRC connection re-establishment request to the terminal, when a response to the path switch request is received from the MME.

DETAILED DESCRIPTION OF THE EMBODIMENTS

Figure 1:
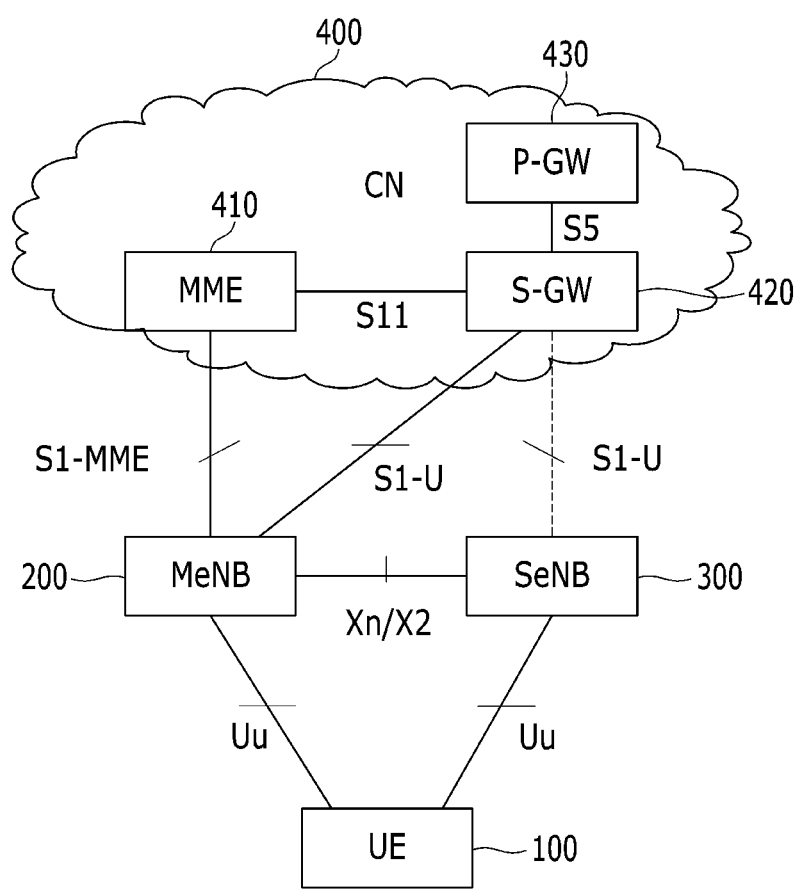
FIG. 1 is a diagram illustrating a structure of a cellular network for dual connectivity support according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In the entire specification, a terminal may indicate a mobile terminal (MT), a mobile station (MS), an advanced mobile station (AMS), a high reliability mobile station (HR-MS), a subscriber station (SS), a portable subscriber station (PSS), an access terminal (AT), and user equipment (UE), and may include an entire function or a partial function of the MT, the MS, the AMS, the HR-MS, the SS, the PSS, the AT, and the UE.

Further, a base station (BS) may indicate an advanced base station (ABS), a high reliability base station (HR-BS), a small BS, a node B (nodeB), an evolved node B (eNodeB), an access point (AP), a radio access station (RAS), a base transceiver station (BTS), a mobile multihop relay (MMR)-BS, a relay station (RS) that performs a function of the BS, and an HR-RS that performs a function of the BS, and may include an entire function or a partial function of the BS, the ABS, the HR-BS, the small BS, the nodeB, the eNodeB, the AP, the RAS, the BTS, the MMR-BS, the RS, and the HR-RS.

1. Protocol Structure for Dual Connectivity

FIG. 1 is a diagram illustrating a structure of a cellular network for dual connectivity support according to an exemplary embodiment of the present invention.

A network structure that is considered for enhancing a small cell in a 3GPP LTE/System Architecture Evolution (SAE) system is shown in FIG. 1. In a network structure in which a macro cell and a plurality of dense small cells are disposed to overlap, in order to improve performance of UE 100, the macro cell and the small cells operate through close cooperation. For convenience of description, hereinafter, in an overlapped cellular network environment, a base station that generally performs the control and service of the UE 100 is referred to as a Master eNodeB (MeNB) 200, and a base station that provides an auxiliary service is referred to as a Secondary eNodeB (SeNB) 300. The MeNB 200 may be a macro base station or a small base station, and the SeNB 300 may be a macro base station or a small base station. An interface used for close cooperation between the MeNB 200 and the SeNB 300 is referred to as Xn or X2 (Xn/X2), and interworking between the MeNB 200 or the SeNB 300 and a Core Network (CN) 400 is performed through an interface S1-MME and an interface S1-U. The CN 400 includes a Mobility Management Entity (MME) 410, a Serving-Gateway (S-GW) 420, and a Packet Data Network-Gateway (P-GW) 430. The MME 410 and the S-GW 420 may be connected through an interface S11. The S-GW 420 and the P-GW 430 may be connected through an interface S5. Interworking between the MeNB 200 or the SeNB 300 and the UE 100 is performed through an interface Uu. The UE 100 may have dual connectivity to the MeNB 200 and the SeNB 300. For interworking between an Evolved-Universal Terrestrial Radio Access Network (E-UTRAN) and the CN 400, the MeNB 200 performs a control plane interworking procedure with the MME 410 through the interface S1-MME, and the MeNB 200 or the SeNB 300 performs a user plane interworking procedure with the S-GW 420 through the interface S1-U. A user plane interworking procedure between the S-GW 420 and the SeNB 300 through the interface S1-U may be changed according to a user plane protocol structure to be described later.

In a cellular network structure that supports dual connectivity that is illustrated in FIG. 1, the following control plane protocol and user plane protocol may be considered. In a structure of a control plane protocol for dual connectivity, a Radio Resource Control (RRC) protocol is located at the MeNB 200, but an RRC protocol is not located at the SeNB 300. A structure of a user plane protocol may have two forms according to whether a bearer is split and disposition of a user plane protocol of the SeNB 300. A first form in which a user plane protocol may not support bearer split and is a form in which a Packet Data Convergence Protocol (PDCP), a Radio Link Control (RLC) protocol, a Medium Access Control (MAC) protocol, and a Physical (PHY) protocol are located in the SeNB 300. A second form is one in which a user plane protocol may support a bearer split, and is a form in which an RLC protocol, a MAC protocol, and a PHY protocol are located at the SeNB 300. A user plane protocol structure of a first form is one in which an entire user plane protocol of an eNodeB that is suggested in 3GPP LTE-Adv. (Advanced) is located at the SeNB 300. A user plane protocol structure of a second form is one in which the remaining user plane protocols, except for a PDCP among user plane protocols of an eNB that is suggested in 3GPP LTE-Adv., are located at the SeNB 300. A structure of a control plane protocol and a structure of a user plane protocol may be the same as a structure that is illustrated in FIGS. 2 and 3.

Figure 2:
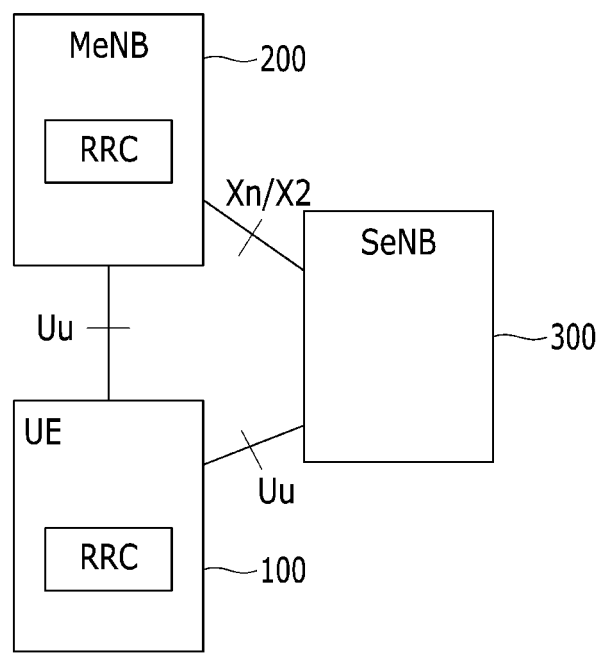
FIG. 2 is a diagram illustrating a structure of a control plane protocol for dual connectivity according to an exemplary embodiment of the present invention.

FIG. 2 is a diagram illustrating a structure of a control plane protocol for dual connectivity according to an exemplary embodiment of the present invention.

A control plane protocol of the MeNB 200 includes an RRC protocol, but a control plane protocol of the SeNB 300 does not include an RRC protocol. A control plane protocol of the UE 100 includes an RRC protocol.

Figure 3:
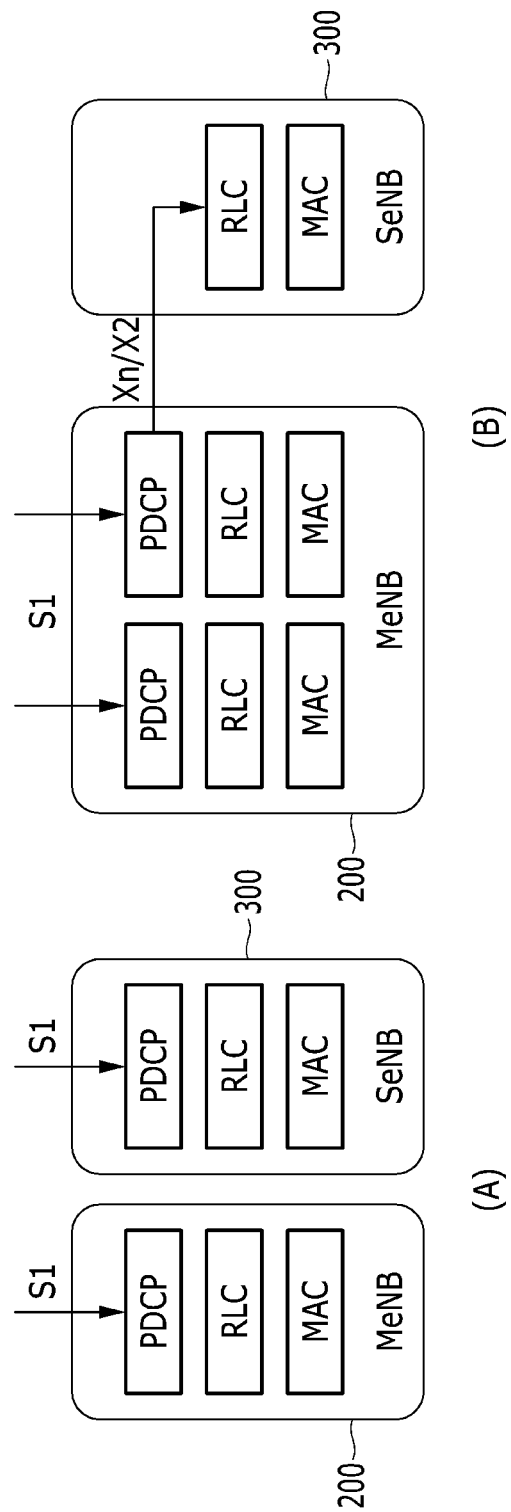
FIG. 3 is a diagram illustrating a structure of a user plane protocol for dual connectivity according to an exemplary embodiment of the present invention.

FIG. 3 is a diagram illustrating a structure of a user plane protocol for dual connectivity according to an exemplary embodiment of the present invention.

Specifically, (A) of FIG. 3 illustrates a user plane protocol structure of the above-described first form. That is, a user plane protocol of the SeNB 300 includes a PDCP.

(B) of FIG. 3 illustrates a user plane protocol structure of the above-described second form. That is, a user plane protocol of the SeNB 300 does not include a PDCP. A user plane protocol structure that is illustrated in (B) of FIG. 3 may support a bearer split function.

Hereinafter, in a cellular network structure in which dual connectivity that is illustrated in FIG. 1 is available, a method in which an RRC procedure is performed will be described. Here, the RRC procedure is a procedure that is related to an RRC protocol, and may include an RRC connection re-establishment procedure and a handover procedure. Specifically, a method and procedure that are signaled for operation of an RRC protocol that is located at the MeNB 200 and the UE 100 based on a control plane protocol structure that is illustrated in FIG. 2 and a user plane protocol structure that is illustrated in (B) of FIG. 3 will be described. A method and procedure for RRC signaling according to an exemplary embodiment of the present invention may support a scenario (e.g., a first scenario to a third scenario) for enhancing a small cell in a cellular network. Thereby, RRC signaling can be efficiently performed.

2. Method of Signaling RRC Message in Dual Connectivity Structure

In a cellular network structure that supports dual connectivity, a signaling structure for an RRC procedure will be described. Present 3GPP Release (Rel)-11 defines a method in which a Signaling Radio Bearer (SRB) is set for RRC signaling and in which an RRC message is exchanged using a Common Control Channel (CCCH) and a Dedicated Control Channel (DCCH). SRB that is considered in an RRC specification of the present 3GPP Rel-11 is SRB0, SRB1, and SRB2, and each SRB is used for different objects. Specifically, SRB0 may be used for transmitting/receiving an RRC message on a CCCH using an RLC Transparent Mode (TM). The SRB1 and the SRB2 may be used for transmitting/receiving an RRC message on a DCCH using an RLC Acknowledgement Mode (AM). The SRB1 and the SRB2 have the difference in a kind and priority of a message that is exchanged through the SRB1 and the SRB2. Specifically, the SRB1 may be used for transmitting/receiving an RRC message having a higher priority than a message that is transmitted/received through the SRB2. The SRB2 may be used for transferring Non-Access Stratum (NAS) information and transmitting/receiving an RRC message having a lower priority such as Minimization of Driver Test (MDT) related information.

2-1. RRC Message Signaling Structure 2-1-1. Structure According to RRC Message Transfer Path When a network structure and a protocol structure for enhancing the above-described small cell are considered, a signaling structure between the MeNB 200 and the UE 100 for an RRC procedure will be described with reference to FIGS. 4 to 6.

Figure 4:
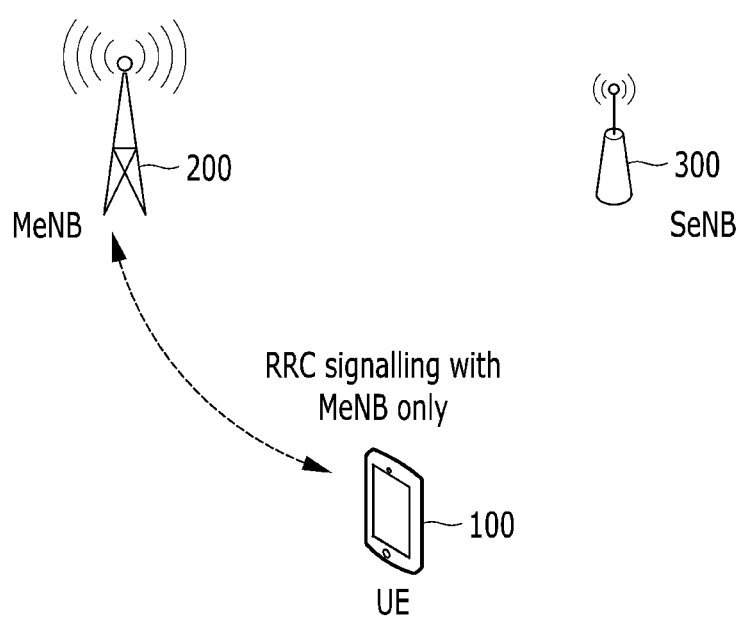
FIG. 4 is a diagram illustrating an RRC signaling structure according to an exemplary embodiment of the present invention.

FIG. 4 is a diagram illustrating an RRC signaling structure according to an exemplary embodiment of the present invention. Specifically, FIG. 4 is a diagram illustrating an RRC signaling structure (hereinafter, a 'first RRC signaling structure') using only the MeNB 200.

A first RRC signaling structure (method) is a signaling structure that always performs an RRC procedure using a Uu interface between the MeNB 200 and the UE 100. Because the UE 100 always performs an RRC procedure with the MeMB 200 through a preset radio link, the UE 100 performs an RRC procedure without considering a location of the UE 100 and a state of a radio link between the UE 100 and the MeNB 200. Because the first RRC signaling structure does not use a user plane protocol of the SeNB 300 and an Xn/X2 interface, the first RRC signaling structure does not require a procedure for an SRB configuration of the SeNB 300, and can minimize an influence in an RRC specification. Because the first RRC signaling structure does not perform an RRC procedure in consideration of a location of the UE 100 and a radio link state between the UE 100 and the eNodeB (e.g., 200 or 300) in a structure in which dual connectivity is available, robustness of an RRC signaling procedure may be deteriorated, and the first RRC signaling structure cannot efficiently operate in all scenarios (e.g., first to third scenarios) that are considered in enhancement of a 3GPP small cell. For example, as in the first scenario, when the MeNB 200 and the SeNB 300 use the same frequency and when the UE 100 moves to the center of a cell that the SeNB 300 controls, a possibility of a problem occurring in message transmission/reception between the UE 100 and the MeNB 200 increases, and this may cause a Radio Link Failure (RLF). Further, because the UE 100 always performs an RRC procedure using a single eNodeB (i.e., the MeNB 200), RRC diversity, by which the same RRC message is transferred through several paths, is not available. Therefore, it may be difficult to improve mobility related performance.

Figure 5:
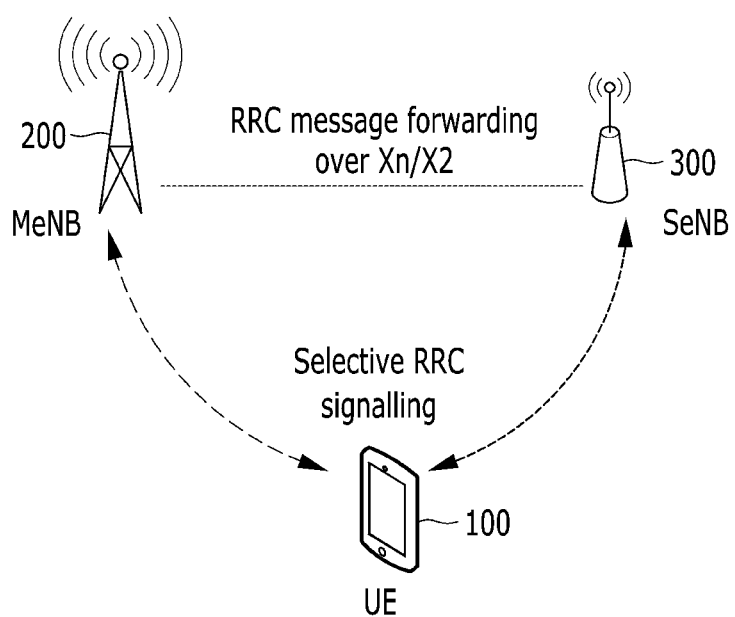
FIG. 5 is a diagram illustrating an RRC signaling structure according to another exemplary embodiment of the present invention.

FIG. 5 is a diagram illustrating an RRC signaling structure according to another exemplary embodiment of the present invention. Specifically, FIG. 5 illustrates an RRC signaling structure (hereinafter, a 'second RRC signaling structure') using the MeNB 200 and the SeNB 300.

The second RRC signaling structure (method) is a one in which the UE 100 performs an RRC procedure through the MeNB 200 or the SeNB 300 under the control of the MeNB 200 in consideration of a location of the UE 100 and a communication environment such as a radio link state (quality) between the UE 100 and the eNodeB (e.g., 200 or 300). Because the UE 100 performs an RRC procedure through a radio link that the MeNB 200 instructs, the UE 100 may perform the RRC procedure with a more environmentally adaptive method than that of the first RRC signaling structure. Thereby, the second RRC signaling structure can enhance robustness of transmission/reception of the RRC message and lower an occurrence probability of an RLF even in an environment of the first scenario. However, in the second RRC signaling structure, for an RRC procedure between the MeNB 200 and the UE 100, a measurement procedure for selecting a radio link and an SRB configuration procedure between the SeNB 300 and the UE 100 are required. In the second RRC signaling structure, because an RRC message transmitting/receiving procedure is performed through Xn/X2, delay that occurs in the RRC procedure may increase. Further, because the UE 100 always performs an RRC procedure using one eNodeB of the MeNB 200 and the SeNB 300, RRC diversity may not be available. Therefore, it may be difficult to improve mobility related performance.

Figure 6:
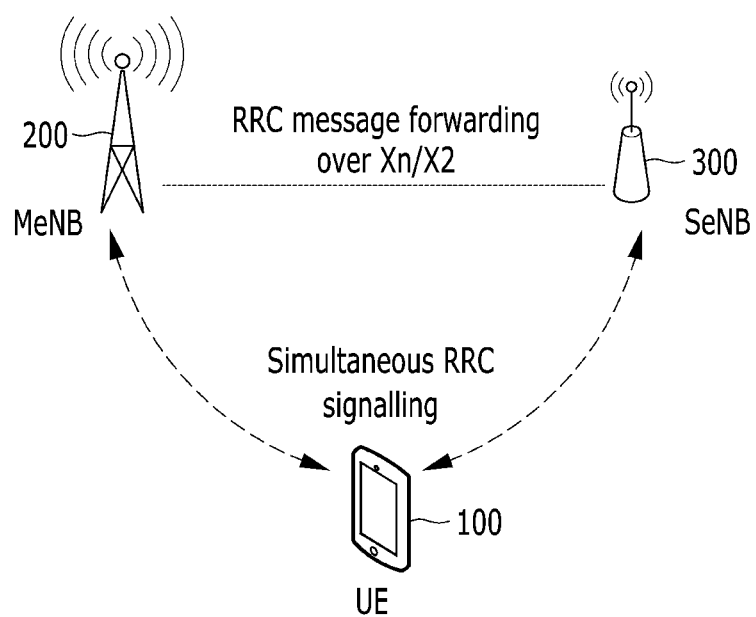
FIG. 6 is a diagram illustrating an RRC signaling structure according to another exemplary embodiment of the present invention.

FIG. 6 is a diagram illustrating an RRC signaling structure according to another exemplary embodiment of the present invention. Specifically, FIG. 6 illustrates an RRC signaling structure (hereinafter, a 'third RRC signaling structure') simultaneously using the MeNB 200 and the SeNB 300.

The third RRC signaling structure (method) is one in which the UE 100 performs an RRC procedure simultaneously using the MeNB 200 and the SeNB 300. In the third RRC signaling structure, because the same RRC message is transmitted through different paths, robustness of RRC message transmission/reception can be enhanced, compared with the first and second RRC signaling structures. Further, because RRC diversity is not available, mobility related performance can be improved. However, in a third RRC signaling structure, for an RRC procedure, a measurement procedure for selecting a radio link is required and an SRB configuration procedure of the SeNB 300 is required. Further, in the third RRC signaling structure, because the RRC message is transmitted/received through Xn/X2, the RRC procedure may be delayed. Further, because the side that receives the RRC message may receive the same RRC message several times, in the third RRC signaling structure, a detecting method when receiving the same message, a state change method (e.g., an apparatus that receives an RRC message is processed to not change to an abnormal state), and a method of indicating simultaneous transmission of the same message should be considered. Therefore, because the third RRC signaling structure may have a great influence on an RRC specification, consideration of this is required.

2-1-2. Protocol Structure for Exchanging RRC Message

A protocol structure for first to third RRC signaling structures will be described.

Specifically, in the first RRC signaling structure, for RRC message signaling, an RRC protocol of the MeNB 200 and the UE 100 performs an SRB configuration function, and an RRC message exchange procedure is performed through a Uu interface between the MeNB 200 and the UE 100. That is, an RRC protocol of the MeNB 200 and the UE 100 performs an SRB configuration function to L2 (data link layer) protocols of each node. The RRC protocol of the MeNB 200 and the UE 100 exchanges an RRC message using SRB. Because a structure of an SRB configuration procedure and an RRC message exchange procedure of existing Rel-11 may be equally/similarly used, the structure has little influence on the eNodeB (e.g., 200 or 300) and the UE 100.

In the second RRC signaling structure or the third RRC signaling structure, for RRC message signaling, an RRC protocol of the MeNB 200 and the UE 100 generally performs an SRB configuration function, and an RRC message exchange procedure is performed using a Uu interface between the MeNB 200 and the UE 100. In addition, because an RRC message exchange procedure should be able to be performed through a Uu interface between the SeNB 300 and the UE 100 according to a radio link state, a function for an SRB configuration in the SeNB 300 is additionally required. That is, for the UE 100 in which dual connectivity is available, the SeNB 300 requires a function of setting a radio resource necessary for an RRC procedure, and hereinafter, a constituent element that performs such a function is referred to as a Resource Configurator (RC). A function of the RC that is located at the SeNB 300 is as follows. The RC of the SeNB 300 may have a user plane protocol configuration function for Radio Bearer (RB) establishment. Specifically, the RC of the SeNB 300 may have a user plane protocol configuration function of the SeNB 300 for setting SRB and Data Radio Bearer (DRB) based on configuration information that is received from the MeNB 200. Further, the RC of the SeNB 300 may have a function of reporting change contents that are related to a radio resource configuration of the SeNB 300. Specifically, when a change of a radio resource for SRB and DRB that are set with dual connectivity is necessary according to determination of Radio Resource Management (RRM) of the SeNB 300, the RC of the SeNB 300 may have a function of reporting radio resource change related information to the MeNB 200.

Figure 7:
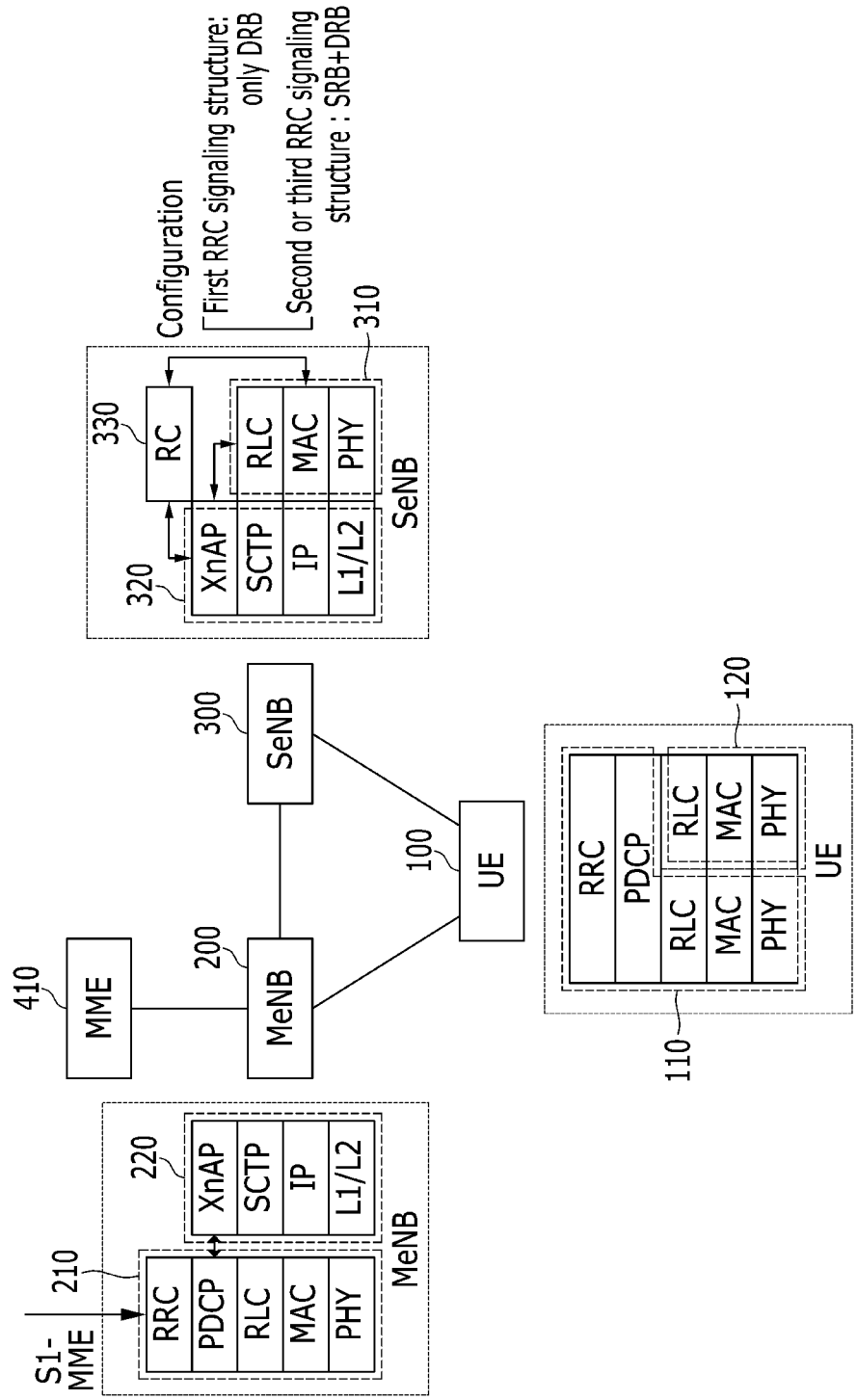
FIG. 7 is a diagram illustrating a protocol interworking structure between an MeNB, an SeNB, and a terminal according to an exemplary embodiment of the present invention.

FIG. 7 is a diagram illustrating a protocol interworking structure between the MeNB 200, the SeNB 300, and the UE 100 according to an exemplary embodiment of the present invention. Specifically, FIG. 7 is a diagram illustrating a function structure of the MeNB 200 and the SeNB 300 for exchanging an RRC message.

A protocol stack 210 of the MeNB 200 may be interworked with an MME 410 through an interface S1-MME. A protocol stack 220 of the MeNB 200 is a protocol for an interface Xn/X2. The protocol stack 220 for an Xn/X2 control plane function of the MeNB 200 may include an Xn/X2 Application Protocol (XnAP), a Stream Control Transmission Protocol (SCTP), an Internet Protocol (IP), and an L1 (physical layer)/L2 (data link layer) protocol. The protocol stack 210 and the protocol stack 220 may be interworked.

A protocol stack 320 of the SeNB 300 is a protocol for an interface Xn/X2. The protocol stack 320 of the SeNB 300 may include an XnAP, an SCTP, an IP, and an L1/L2 protocol. A protocol stack 310 of the SeNB 300 may be interworked with the protocol stack 320. An RC 330 of the SeNB 300 may be interworked with each of the user plane protocol stack 310 and the XnAP protocol stack 320 of the SeNB 300. Specifically, the RC 330 may perform only a DRB configuration function in the first RRC signaling structure. In the second RRC signaling structure or the third RRC signaling structure, the RC 330 may perform an SRB configuration function as well as a DRB configuration function.

A protocol stack 110 of the UE 100 may be interworked with the protocol stack 210 of the MeNB 200. A protocol stack 120 of the UE 100 may be interworked with the protocol stack 310 of the SeNB 300.

The MeNB 200 and the SeNB 300 may perform an additional measurement function as well as a function (e.g., a function of the RC 330) for the above-described RRC signaling. That is, the MeNB 200 and the SeNB 300 may perform an additional measurement function of a radio link between the SeNB 300 and the UE 100 in addition to an existing RRM measurement function. Therefore, a measurement object that is set to the UE 100 may include a carrier frequency of a master cell (e.g., a cell of the MeNB 200) and a secondary cell (e.g., a cell of the SeNB 300) in which dual connectivity is set, and may include a reporting configuration of each cell.

In a structure in which dual connectivity is available, when the UE 100 and the eNodeB (200 or 300) perform an RRC procedure, the UE 100 and the eNodeB (200 or 300) should recognize an RRC message exchange method (e.g., recognize any structure of first to third RRC signaling structures). That is, in the first RRC signaling structure or the second RRC signaling structure, an RRC message for a specific transaction is transmitted one time. However, in the third RRC signaling structure, because an RRC message for a specific transaction is simultaneously transmitted, a node that receives the RRC message may receive the same RRC message multiple times. Therefore, a node that receives an RRC message should determine whether the received RRC message is a simultaneously transmitted message and should process a simultaneous transmission message.

When simultaneously transmitting an RRC message, the third RRC signaling structure may have two simultaneous transmission structures (a first simultaneous transmission structure and a second simultaneous transmission structure) according to a protocol that performs simultaneous transmission. The first simultaneous transmission structure is a structure in which an RRC protocol performs simultaneous transmission of a message. The second simultaneous transmission structure is a structure in which a PDCP performs simultaneous transmission of a message. A first simultaneous transmission structure will be described in detail with reference to FIG. 8, and a second simultaneous transmission structure will be described in detail with reference to FIGS. 9 and 10.

Figure 8:
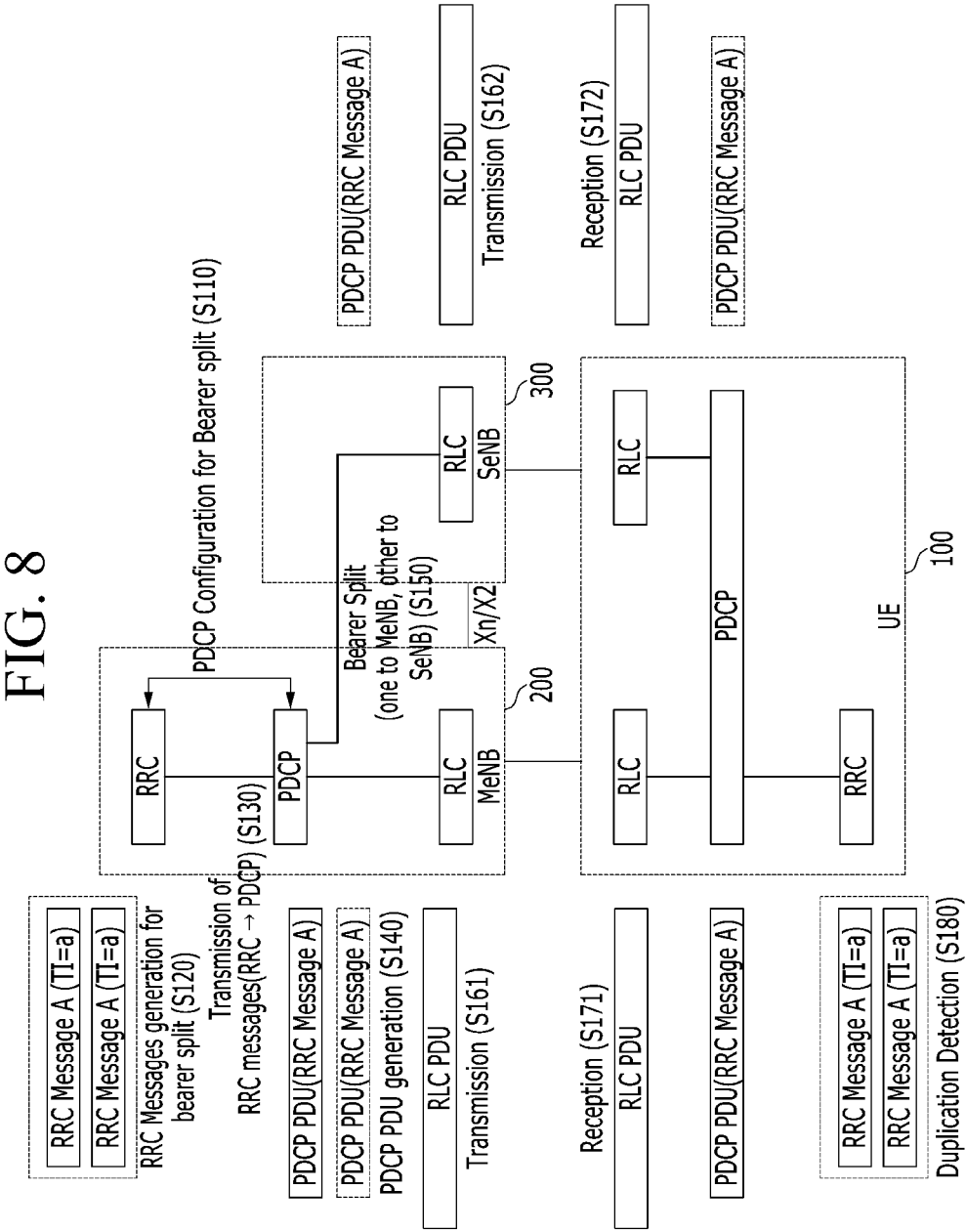
FIG. 8 is a diagram illustrating a process of simultaneously transmitting an RRC message through an RRC protocol according to an exemplary embodiment of the present invention.

FIG. 8 is a diagram illustrating a process of simultaneously transmitting an RRC message through an RRC protocol according to an exemplary embodiment of the present invention. For convenience of description, FIG. 8 illustrates a case in which a node that transmits an RRC message is the MeNB 200 and a node that receives an RRC message is the UE 100.

The RRC protocol and the PDCP of the MeNB 200 set a PDCP for bearer split (S110).

The RRC protocol of the MeNB 200 generates a plurality of RRC messages for simultaneous transmission (S120). For example, the RRC protocol of the MeNB 200 generates two RRC messages.

The RRC protocol of the MeNB 200 transmits an RRC message to the PDCP of the MeNB 200 (S130).

The PDCP of the MeNB 200 generates a plurality of PDCP Protocol Data Units (PDU) including the received RRC message (S140). For example, the PDCP of the MeNB 200 generates two PDCP PDUs.

The PDCP of the MeNB 200 transfers one of two PDCP PDUs to an RLC protocol of the MeNB 200 through a bearer split function, and transfers the remaining PDCP PDU to an RLC protocol of the SeNB 300 (S150).

The RLC protocol of the MeNB 200 generates an RLC PDU and transmits the RLC PDU to the UE 100 (S161). The RLC protocol of the SeNB 300 generates an RLC PDU and transmits the RLC PDU to the UE 100 (S162).

Each of RLC protocols of the UE 100 receives an RLC PDU from the MeNB 200 (S171) and receives the RLC PDU from the SeNB 300 (S172). The RLC protocol of the UE 100 extracts an RLC SDU (PDCP PDU) from the RLC PDU and transfers the RLC SDU to a PDCP of the UE 100.

The PDCP of the UE 100 extracts an RRC message from the PDCP PDU and transfers the RRC message to an RRC protocol of the UE 100.

The RRC protocol of the UE 100 performs a duplication detection procedure of an RRC message that is received from the PDCP of the UE 100 (S180).

In a first simultaneous transmission structure that is illustrated in FIG. 8, in order for a node (e.g., the UE 100) to recognize simultaneous transmission of the RRC message, a node (e.g., the MeNB 200) that transmits the RRC message may set a parameter that instructs simultaneous transmission within the RRC message and transmit an RRC message including a simultaneous transmission parameter. The RRC protocol of the node (e.g., the UE 100) that receives the RRC message may determine whether a simultaneous transmission parameter exists within the RRC message and recognize simultaneous transmission of the RRC message. Therefore, in a first simultaneous transmission structure, an RRC message including a simultaneous transmission parameter can be transmitted/received.

Figure 9:
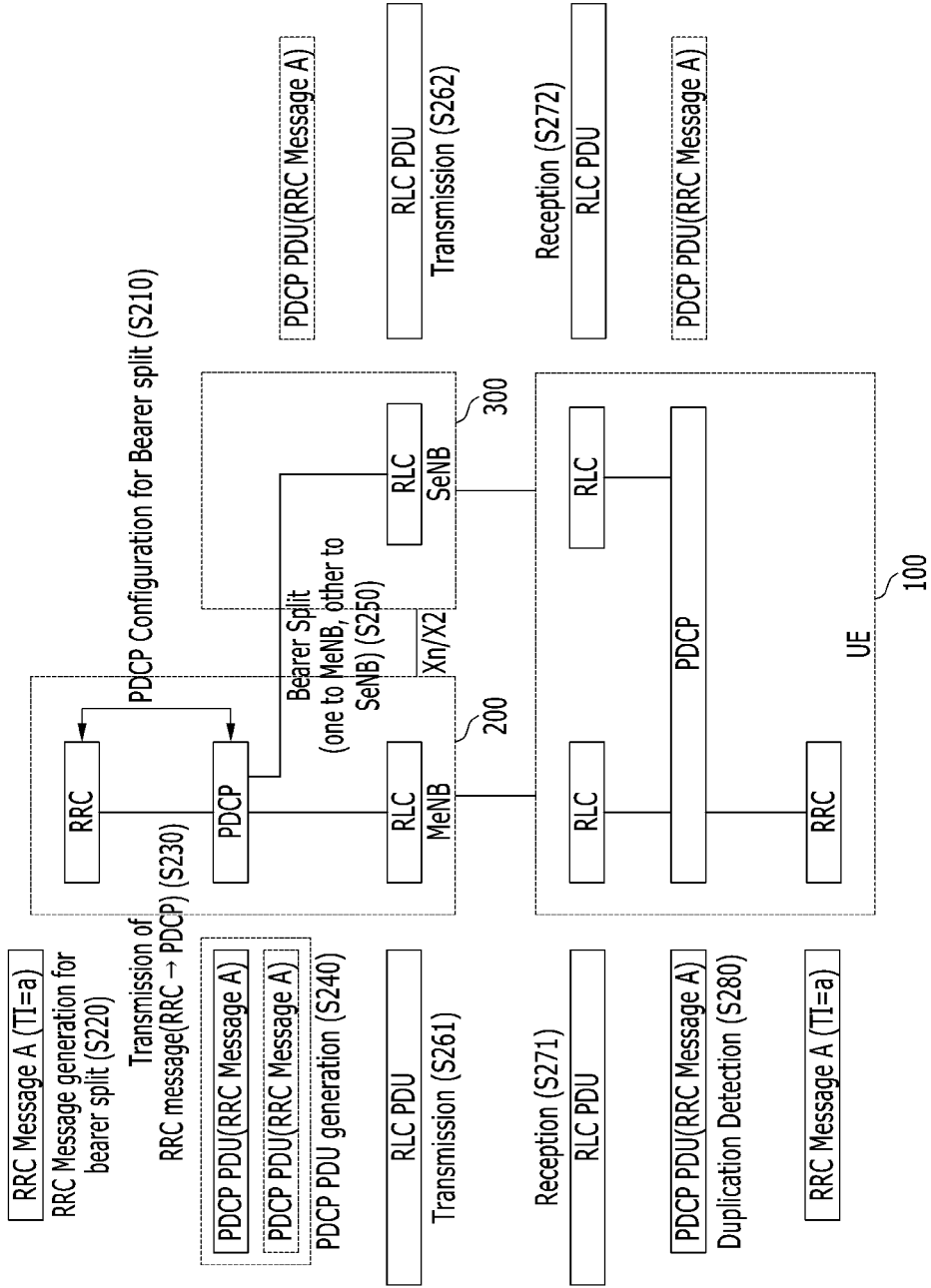
FIG. 9 is a diagram illustrating a process of simultaneously transmitting an RRC message through a PDCP protocol according to an exemplary embodiment of the present invention.
Figure 10:
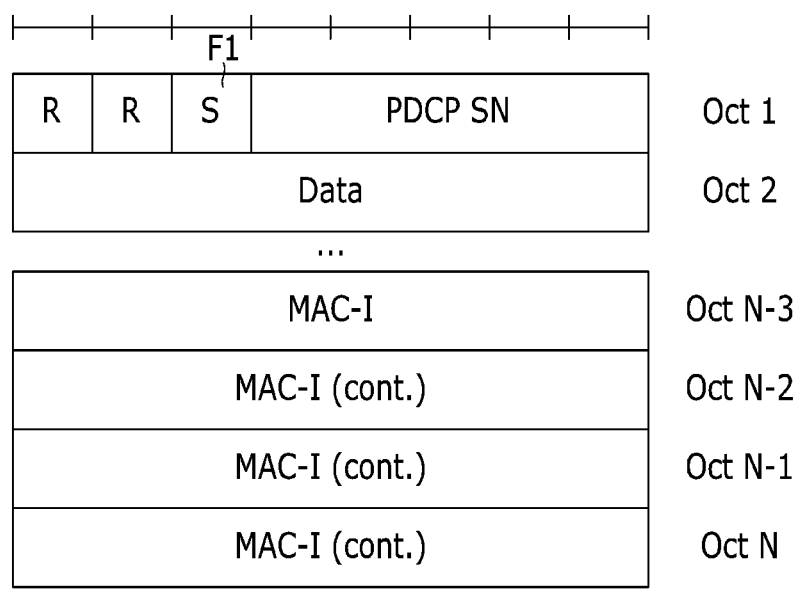
FIG. 10 is a diagram illustrating a structure of a PDCP PDU for simultaneous transmission of an RRC message according to an exemplary embodiment of the present invention.

FIG. 9 is a diagram illustrating a process of simultaneously transmitting an RRC message through a PDCP protocol according to an exemplary embodiment of the present invention. For convenience of description, FIG. 10 illustrates a case in which a node that transmits an RRC message is the MeNB 200 and a node that receives an RRC message is the UE 100.

The RRC protocol and the PDCP of the MeNB 200 set a PDCP for bearer split (S210).

The RRC protocol of the MeNB 200 generates an RRC message for simultaneous transmission (S220).

The RRC protocol of the MeNB 200 transmits the generated RRC message and control information that instructs simultaneous transmission to a PDCP, which is a subordinate layer protocol (S230).

The PDCP of the MeNB 200, having received a request for simultaneous transmission of a specific RRC message from the RRC protocol, generates a plurality of PDCP PDUs using the received RRC message (S240). For example, the PDCP of the MeNB 200 generates two PDCP PDUs.

The PDCP of the MeNB 200 transfers one of two PDCP PDUs through a bearer split function to an RLC protocol of the MeNB 200 and transfers the remaining PDCP PDU to an RLC protocol of the SeNB 300 (S250).

The RLC protocol of the MeNB 200 generates an RLC PDU and transmits the RLC PDU to the UE 100 (S261), and the RLC protocol of the SeNB 300 generates an RLC PDU and transmits the RLC PDU to the UE 100 (S262).

Each of RLC protocols of the UE 100 that performs dual connectivity receives an RLC PDU from each of the MeNB 200 and the SeNB 300 (S271 and S272). The RLC protocol of the UE 100 extracts an RLC SDU (PDCP PDU) from the RLC PDU and transfers the RLC SDU (PDCP PDU) to a PDCP of the UE 100.

The PDCP of the UE 100 performs a duplication detection procedure of a plurality of RLC Service Data Units (SDUs) received from each RLC protocol (S280). For example, the PDCP of the UE 100 performs the duplication detection procedure of two RLC SDUs. After performing a duplication detection procedure, the PDCP of the UE 100 extracts an RRC message from the PDCP PDU and transfers the RRC message to an RRC protocol of the UE 100.

When the second simultaneous transmission structure is applied, in order to support simultaneous transmission of a message, the PDCP may use two methods (a first method and a second method). Specifically, the first method is a method in which a PDCP uses a field that instructs simultaneous transmission within a PDCP message header. The second method is a method in which a PDCP uses a handover support function of the PDCP.

In the first method, the PDCP may instruct simultaneous transmission of a message using an S field of a PDCP PDU header for transmitting SRB. In the first method, the transmitting/receiving PDCP may recognize whether simultaneous transmission is performed using a simultaneous transmission parameter field (S field) within a PDCP message and perform a processing of simultaneous transmission. A PDCP PDU structure when a first method is applied will be described in detail with reference to FIG. 10.

In a second method, a PDCP may perform a duplication processing using a duplication elimination function when performing handover among functions of the PDCP. Specifically, a PDCP of a transmitting node may perform simultaneous transmission by setting the same sequence number to a PDCP header, and a PDCP of a receiving node may perform duplication processing through a duplication elimination function. Therefore, in the second method, even when handover is not performed, the PDCP may use a duplication elimination function of an AM DRB and an AM SRB.

FIG. 10 is a diagram illustrating a structure of a PDCP PDU for simultaneous transmission of an RRC message according to an exemplary embodiment of the present invention. Specifically, FIG. 10 is a diagram illustrating a PDCP PDU structure when a first method is applied for simultaneous transmission.

As illustrated in FIG. 10, the PDCP illustrates simultaneous transmission of a message using an S field F1 within a PDCP message header. Specifically, when the S field F1 is set, simultaneous transmission may be performed, and when the S field F1 is not set, simultaneous transmission may not be performed.

In a third RRC signaling structure, when simultaneous transmission and reception of a message is performed through a first simultaneous transmission structure or a second simultaneous transmission structure, an RRC protocol or a PDCP, having received the same message, should not be changed to an abnormal state. That is, in a network structure in which dual connectivity is available, RRC messages used for an RRC procedure between the UE 100 and the MeNB 200 may be classified into a message that is transferred through a Uu interface between the UE 100 and the MeNB 200 and a message that is transferred through an Xn/X2 interface and a Uu interface between the UE 100 and the SeNB 300. Therefore, because it is estimated that delay occurring for transfer of these messages is about a maximum of 60 ms, when a node receives an RRC message several times for the same transaction, a protocol should operate to not change to an abnormal state. For this reason, when a specific RRC message may be simultaneously received, if one RRC message is normally received, a protocol (e.g., an RRC protocol or a PDCP) that can receive a simultaneously transmitted message immediately performs the following procedure (i.e., instead of awaiting simultaneous transmission of the remaining messages), and when the same RRC message is received in the following other operation states, the protocol discards a corresponding message. Thereby, a node can be prevented from being changed to an abnormal state.

2-1-3. SRB Structure for Exchanging RRC Message

In 3GPP LTE/SAE Rel-11, SRB used for an RRC procedure between the UE 100 and the eNodeB (e.g., 200) has three forms of SRB0, SRB1, and SRB2, as described above. However, in a cellular network structure in which dual connectivity is available, two SRB structures (a first SRB structure and a second SRB structure) may be considered.

The first SRB structure is a form using an SRB structure that is defined in existing Rel-11, and is a structure that sets the same SRB to the MeNB 200 and the SeNB 300. Specifically, SRB0 is used for transmitting/receiving a TM-based CCCH, and SRB1 and SRB2 are used for transmitting/receiving an AM-based DCCH. Particularly, in the second RRC signaling structure or the third RRC signaling structure, the SeNB 300 may set the same SRB (SRB0, SRB1, and SRB2) as that of the MeNB 200 and perform an RRC procedure using SRB0 to SRB2 by determination of the MeNB 200.

The second SRB structure is a structure in which the MeNB 200 uses an SRB structure that is defined in existing Rel-11 and in which the SeNB 300 sets an additional SRB for an RRC procedure. Specifically, in the second RRC signaling structure or the third RRC signaling structure, for the SeNB 300, SRBn, SRB(n+1), and SRB(n+2) that may be additionally set, the SeNB 300 may perform an RRC procedure using SRBn to SRB(n+2). Here, n may be a natural number of 3 or more.

2-2. RRC Message Signaling Procedure

In a cellular network structure in which dual connectivity is available, in order to perform an RRC procedure based on the above-described first to third RRC signaling structures, a measurement procedure, SRB configuration and release procedures, an RRC message transmitting/receiving procedure, and an RLF processing procedure may be considered.

2-2-1. Measurement Procedure

The UE 100 performs a measurement procedure and reports a measured result according to the control of the MeNB 200. For this reason, the MeNB 200 instructs measurement through dedicated signaling to the UE 100 of an RRC_CONNECTED state, and the UE 100, having received a measurement instruction, performs a measurement procedure. For measurement within an E-UTRAN and measurement between different kinds of Radio Access Networks (RAT), a Rel-11 RRC specification suggests five measurement procedures. Particularly, an intra-frequency measurement procedure and an inter-frequency measurement procedure may be considered in a cellular network structure in which dual connectivity is available. The intra-frequency measurement procedure uses a downlink carrier frequency of a serving cell, and the inter-frequency measurement procedure uses a frequency different from a downlink carrier of a serving cell.

A measurement procedure for a first RRC signaling structure is similar to a measurement procedure that is suggested in an RRC specification of the existing Rel-11. However, in the first RRC signaling structure, a path change procedure is not performed. The path change procedure changes a path for RRC signaling exchange based on a measurement result.

Figure 11:
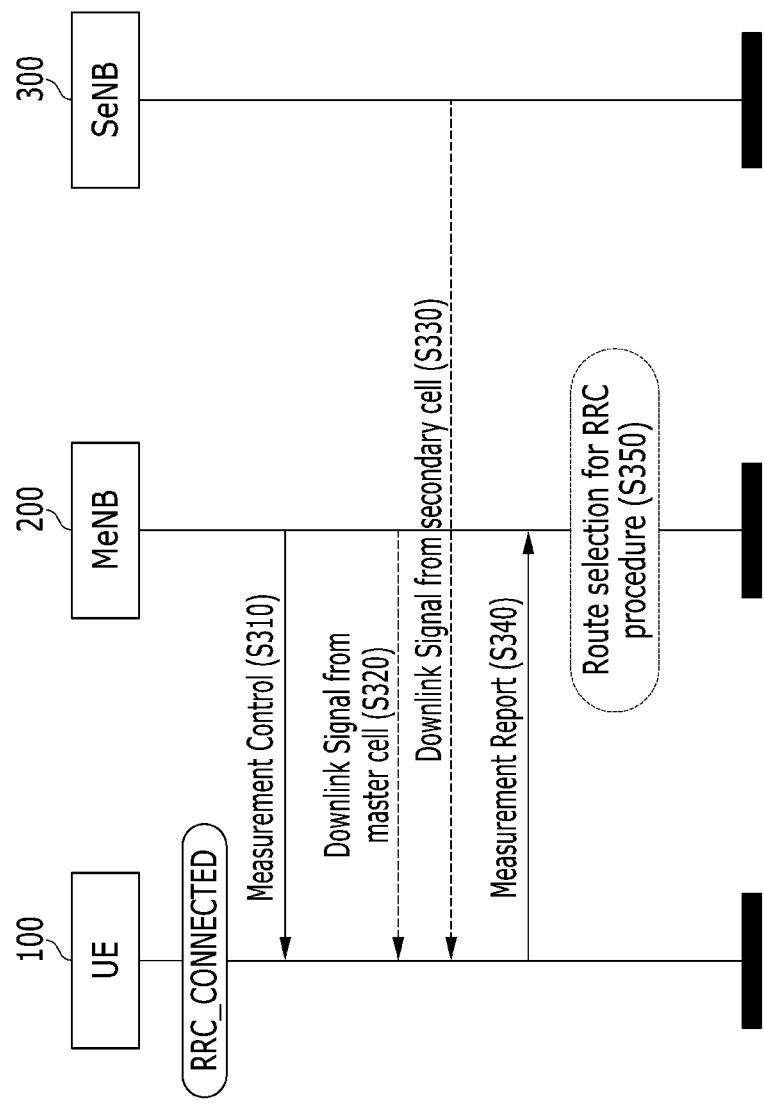
FIG. 11 is a diagram illustrating a measurement procedure according to an exemplary embodiment of the present invention.

A measurement procedure for a second RRC signaling structure or a third RRC signaling structure may be performed, as illustrated FIG. 11, using a measurement procedure that is suggested in an RRC specification of existing Rel-11.

FIG. 11 is a diagram illustrating a measurement procedure according to an exemplary embodiment of the present invention.

The MeNB 200 instructs a measurement configuration procedure to the UE 100 of an RRC_CONNECTED state (S310). Specifically, the MeNB 200 may instruct a measurement procedure of a downlink carrier frequency of a master cell (when dual connectivity is set, an auxiliary cell that is connected to the UE 100 is included) to which the UE 100 presently connects to the UE 100, and may instruct a measurement procedure for searching for an auxiliary cell that can perform dual connectivity to the UE 100.

The UE 100 performs a measurement procedure based on measurement configuration information that is suggested by the MeNB 200. Specifically, the UE 100 may receive a downlink signal from a master cell (e.g., a cell of the MeNB 200) and an auxiliary cell (e.g., a cell of the SeNB 300) (S320 and S330). The UE 100 may perform a measurement procedure using the received downlink signal. The UE 100 may apply layer 3 filtering when performing a measurement procedure.

When information that is measured by the UE 100 arrives with a specific threshold value that is suggested in a measurement configuration procedure (S310) or corresponds to a specific condition (report condition), the UE 100 reports a measuring result to the MeNB 200 (S340).

The MeNB 200 sets a form for RRC signaling and a path for transfer of the RRC message according to a kind of the RRC message (e.g., a message used for selecting simultaneous transmission) based on a measurement report that is reported from the UE 100 (S350). Specifically, the MeNB 200 may determine a path for RRC signaling or whether the RRC message is simultaneously transmitted.

2-2-2. SRB Configuration and Release Procedure

Figure 12:
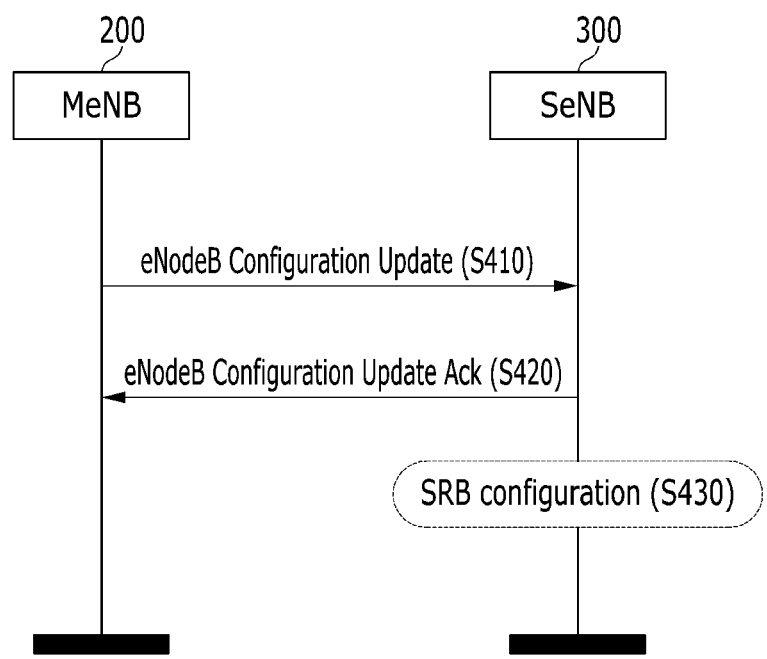
FIG. 12 is a diagram illustrating an SRB configuration procedure according to an exemplary embodiment of the present invention.

FIG. 12 is a diagram illustrating an SRB configuration procedure according to an exemplary embodiment of the present invention.

Specifically, FIG. 12 illustrates a procedure in which the SeNB 300 sets an L1 (physical layer) protocol/L2 (data link layer) protocol for transmitting/receiving an RRC message. An SRB configuration procedure that is illustrated in FIG. 12 is a procedure for a second RRC signaling structure or a third RRC signaling structure.

An RRC protocol of the MeNB 200 transfers information (hereinafter, 'first configuration information') necessary for setting an L2/L1 protocol of the SeNB 300 to an RC 330 of the SeNB 300 (S410).

The RC 330 of the SeNB 300 transmits a response message to a received message to the MeNB 200 (S420), and performs a configuration procedure of a subordinate layer protocol based on the received first configuration information (S430). Specifically, in a process of S410 and S420, because Xn/X2, which is an interface between the MeNB 200 and the SeNB 300, is used, the Xn/X2 performs a function of transferring configuration information that the MeNB 200 provides to the SeNB 300. For processes S410 and S420, messages (e.g., eNodeB Configuration Update message, eNodeB Configuration Update Acknowledge message) that are used in an eNodeB configuration update procedure that is suggested in an existing 3GPP Technical Specification (TS) 36.423 may be adjusted and used.

An SRB release procedure is a procedure in which the SeNB 300 releases SRB of the SeNB 300 that is set through the above-described SRB configuration procedures S410-S430. For an SRB release procedure, the same protocol message (e.g., eNodeB Configuration Update message, eNodeB Configuration Update Acknowledge message) as that of an SRB configuration procedure may be used.

First configuration information that is included in the eNodeB Configuration Update message may include information that is illustrated in Table 1.

TABLE 1

| Classification | Detailed information | Remark |
|---|---|---|
| PHY configuration information | PDSCH (Physical Downlink Shared Channel) configuration information<br>PUSCH (Physical Uplink Shared Channel) configuration information<br>PUCCH (Physical Uplink Control Channel) configuration information<br>UL (Uplink) power control configuration information<br>TPC(Transmitter Power Control) configuration information(PDCCH(Physical Downlink Control Channel), PUSCH)<br>CQI (Channel Quality Indicator) report configuration information<br>scheduling request configuration information | |
| MAC configuration information | UL-SCH (Uplink Shared Channel) configuration information<br>DRX (Discontinuous Reception) configuration information<br>PHR (Power Headroom Report) configuration information | |
| SPS (Semi Persistence Scheduling) configuration information | | |
| RLC configuration information | Logical channel identity | UL-RLC configuration information<br>a) Poll retransmission timer<br>b) Poll PDU,<br>c) Poll Byte |

TABLE 1-continued

| Classification | Detailed information | Remark |
| --- | --- | --- |
| | | d) Maximum retransmission threshold |
| | | DL-RLC configuration information |
| | | a) Reordering timer |
| | | b) Status prohibit timer |
| | Logical channel configuration information | a) Priority |
| | | b) Prioritized bit rate |
| | | c) Bucket size duration |
| | | d) Logical channel group |

2-2-3. RRC Message Transmitting/Receiving Procedure

In a cellular network structure in which dual connectivity is available, after the above-described '2-2-1. measurement procedure' and '2-2-2. SRB configuration procedure' are performed, a transmitting/receiving procedure of an RRC message, which is a procedure that transfers an RRC message through a preset path, is performed.

Specifically, in a first RRC signaling structure, an RRC signaling procedure may always be performed through a radio access interface between the MeNB 200 and the UE 100. In a second RRC signaling structure, an RRC signaling procedure may be performed through a selected one of the MeNB 200 and the SeNB 300. In a third RRC signaling structure, an RRC signaling procedure may be performed by simultaneously using the MeNB 200 and the SeNB 300. In the third RRC signaling structure, simultaneous transmission of a message may be performed according to a protocol structure for the above-described '2-1-2. RRC message exchange'.

2-2-4. RLF Processing Procedure

The UE 100 of an RRC_CONNECTED state recognizes an RLF when a timer T310 indicates out-of-sync of a subordinate layer is expired and when N310 is exceeded, when a maximum trial times error of a Random Access (RA) procedure has occurred, or when the maximum transmitting times of an RLC is exceeded. Here, N310 is maximum consecutive out-of-sync indications.

Specifically, in a cellular network structure in which dual connectivity is available using a first RRC signaling structure, when an RRC procedure is performed, an RRC signaling procedure is performed only through a master cell (e.g., a cell of the MeNB 200), and thus when the UE 100 of a state in which Access Stratum (AS) security is activated is changed to an RLF state, the UE 100 performs an RRC connection re-establishment procedure. Thereby, SRB1 is re-established, and the security related algorithm is reactivated. For an RRC connectivity re-establishment procedure, the UE 100 terminates the timer T310 and starts T311, which is an RRC re-establishment timer. The UE 100 stops all RBs except for SRB0. Further, the UE 100 applies a default physical channel configuration and a default SPS scheduling configuration. The UE 100 releases a configuration related to MAC and applies a default MAC configuration. The UE 100 performs a cell selection procedure.

In a cellular network structure in which dual connectivity is available using a second RRC signaling structure, when an RRC procedure is performed, an RRC signaling procedure is performed using one of a master cell (e.g., a cell of the MeNB 200) and an auxiliary cell (e.g., a cell of the SeNB 300), and thus when the UE 100 of a state in which AS security is activated is changed to an RLF state of a specific cell, the UE 100 may perform an RLC processing procedure according to an occurrence situation (e.g., first to third RLF occurrence situations) of an RLF. A first RLF occurrence situation is a case in which an RLF occurs between a master cell (e.g., a cell of the MeNB 200) and the UE 100. A second RLF occurrence situation is a case in which an RLF occurs between an auxiliary cell (e.g., a cell of the SeNB 300) and the UE 100. A third RLF occurrence situation is a case in which an RLF occurs between both a master cell (e.g., a cell of the MeNB 200) and an auxiliary cell (e.g., a cell of the SeNB 300), and the UE 100.

Specifically, in the first RLF occurrence situation, two recovery procedures (a first recovery procedure and a second recovery procedure) may be considered.

The first recovery procedure is a procedure that restores an RLF through an RRC connection re-establishment procedure. Specifically, the first recovery procedure restores an RLF through an RRC connection re-establishment procedure that is suggested in an existing Rel-11 specification. For this reason, when the UE 100 in which dual connectivity is set enters an RLF state, the UE 100 releases DRB and SRB that are set to a master cell and an auxiliary cell. After a cell selection procedure is performed, the UE 100 performs an RRC connection re-establishment procedure. In this case, because already preset SRB and DRB are entirely released, a service is stopped.

The second recovery procedure is a procedure that restores an RLF through function conversion between dual connectivity cells. The UE 100 performs an RRC procedure by selectively using an SRB that is configured to the MeNB 200 and the SeNB 300. When an RLF occurs in a connection between a specific cell and the UE 100, the second recovery procedure restores the RLF by setting a cell to which the UE 100 can connect as a master cell. The second recovery procedure will be described in detail with reference to FIG. 13.

Figure 13:
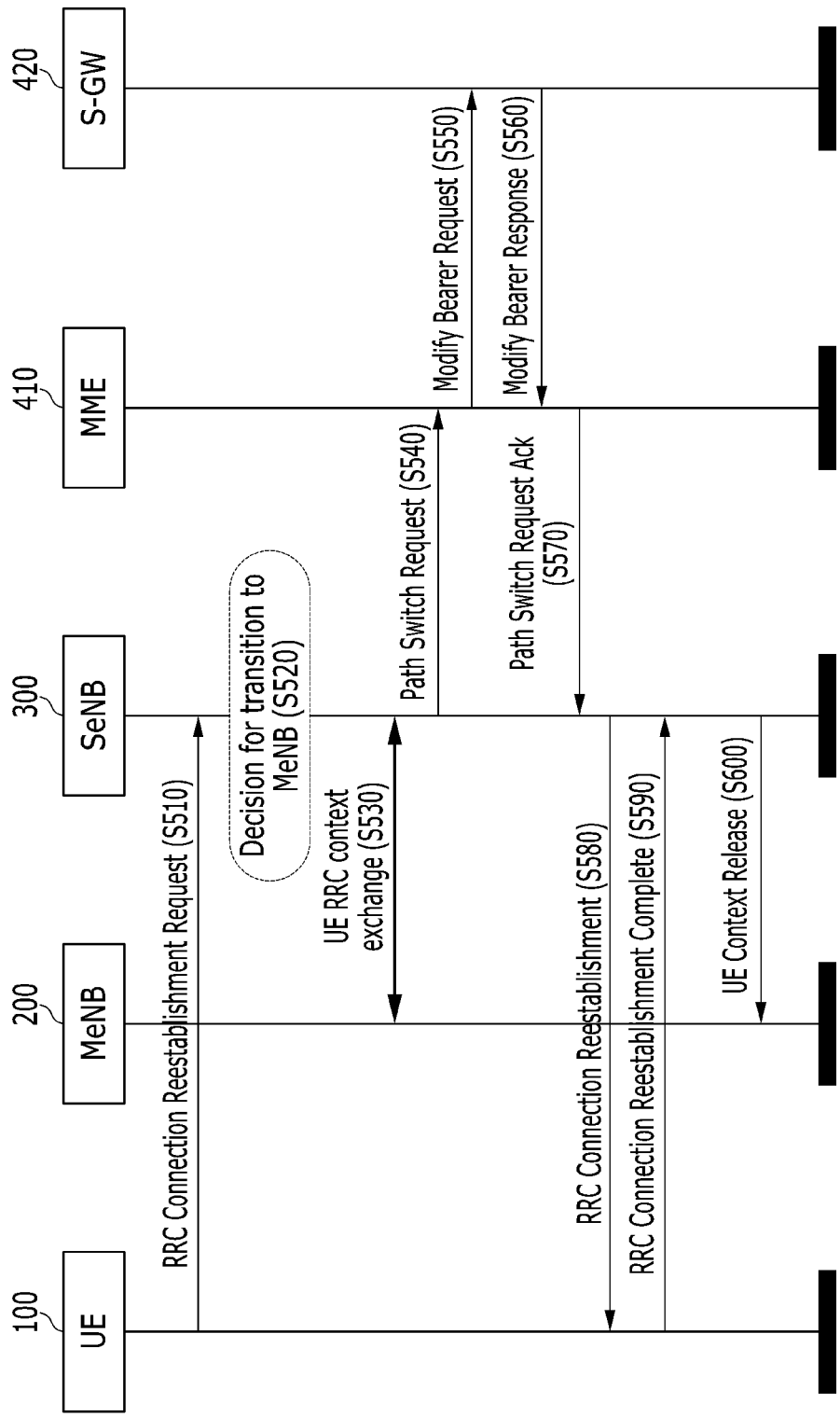
FIG. 13 is a diagram illustrating a process of processing an RLF when the RLF occurs between a cell of the MeNB and the terminal according to an exemplary embodiment of the present invention.

FIG. 13 is a diagram illustrating a process of processing an RLF when the RLF occurs between a cell of the MeNB 200 and the UE 100 according to an exemplary embodiment of the present invention.

When an RLF has occurred in a connection between the UE 100 and a master cell (e.g., a cell of the MeNB 200), the UE 100 notifies an auxiliary cell (e.g., a cell of the SeNB 300) of an RRC connection re-establishment request message based on an RLF occurrence event (S510). Specifically, the UE 100 may transmit an RRC connection re-establishment request message that requests re-establishment of an RRC connection to the master cell to the SeNB 300.

The auxiliary cell performs function conversion to a master cell (S520). Specifically, the SeNB 300 may determine conversion to a MeNB. For this reason, by interworking with the MeNB 200, the SeNB 300 receives an RRC context of the UE 100 that is stored at the MeNB 200 through an Xn/X2 interface (S530).

Thereafter, the SeNB 300 performs a path switch procedure with nodes (e.g., 410, 420) of a CN 400 (S540-S570). Specifically, the SeNB 300 requests a path switch from the MME 410 (S540). The MME 410 requests bearer modification from the S-GW 420 (S550). The S-GW 420 responds to a bearer modification request by the MME 410 (S560). The MME 410 responds to a path switch request by the SeNB 300 (S570). The SeNB 300 sets an S1-U connection with an interface S1-MME through a path switch procedure (S540-S570).

After the path switch procedure S540-S570 is complete, the SeNB 300 sends a response message to an RRC connection re-establishment request of the UE 100 to the UE 100 (S580), and the UE 100, having received the response message, notifies the SeNB 300 of RRC connection re-establishment completion (S590).

After an RRC connection re-establishment procedure between the UE 100 and the SeNB 300 is complete, the SeNB 300 requests release of UE context information that is set to the MeNB 200 (S600).

In a second recovery procedure, a protocol message used in an existing RRC connection re-establishment procedure may be used. However, a 'masterCellFailure' representing a first RLF occurrence situation may be added to a cause value within an RRC connection re-establishment request message, as shown in Table 2.

TABLE 2

| Cause Variable | Value |
| --- | --- |
| ReestablishmentCause ::= | ENUMERATED { reconfigurationFailure, handoverFailure, otherFailure, masterCellFailure, spare1} |

In a second recovery procedure, even if an RLF occurs in a connection between the UE 100 and a master cell, because the UE 100 has dual connectivity to the master cell and an auxiliary cell, in order to transfer an RRC message, the UE 100 may use SRB that is set between the SeNB 300 and the UE 100.

An RLF recovery procedure in a second RLF occurrence situation will be described in detail with reference to FIG. 14.

Figure 14:
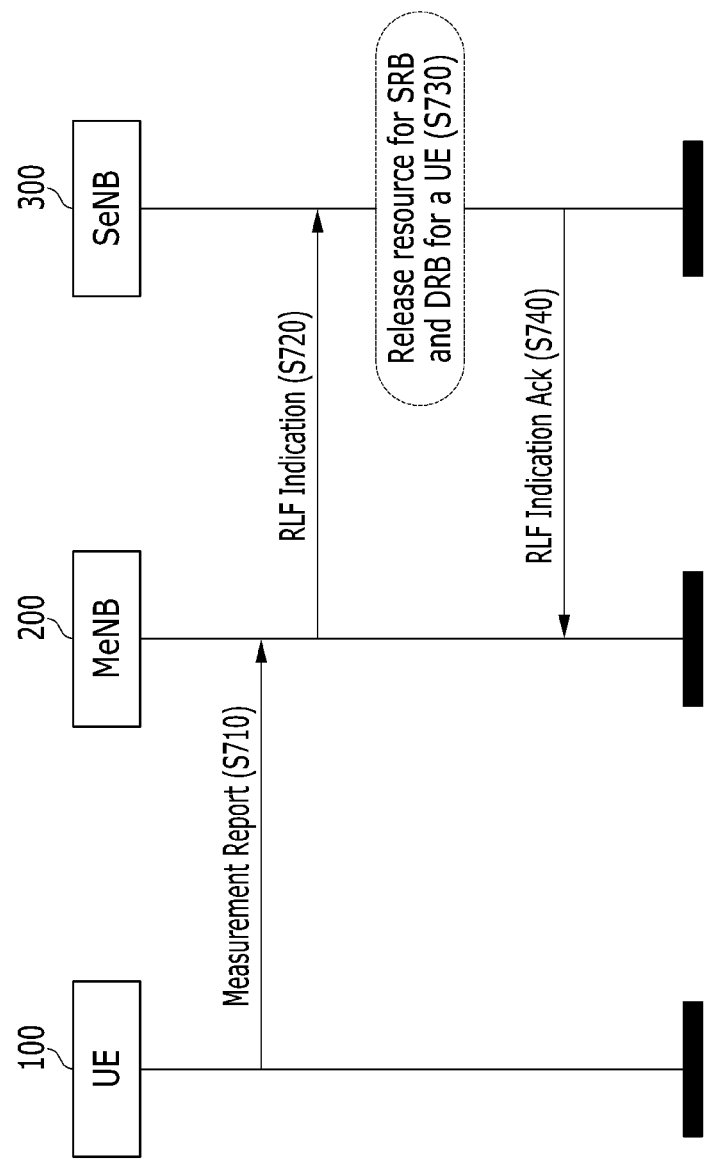
FIG. 14 is a diagram illustrating a process of processing an RLF when the RLF occurs between a cell of the SeNB and the terminal according to an exemplary embodiment of the present invention.

FIG. 14 is a diagram illustrating a process of processing an RLF when the RLF has occurred between a cell of the SeNB 300 and the UE 100 according to an exemplary embodiment of the present invention.

When an RLF occurs in a connection between the UE 100 and an auxiliary cell (e.g., a cell of the SeNB 300), the UE 100 transmits an RLF occurrence event to a master cell (e.g., a cell of the MeNB 200) (S710).

The MeNB 200 recognizes an RLF between the UE 100 and the SeNB 300 and requests release of a radio resource from the SeNB 300 (S720).

The SeNB 300 releases a radio resource corresponding to SRB and DRB that are set for an auxiliary cell that is connected to the UE 100 (S730).

The SeNB 300 transmits a response message to the MeNB 200 (S740).

In a second RLF occurrence situation, because an RRC connection between the UE 100 and a master cell is set, an RRC connection re-establishment procedure of an auxiliary cell is not performed.

In a third RLF occurrence situation, an RLF may be restored through the above-described first recovery procedure.

In a cellular network structure in which dual connectivity is available using a third RRC signaling structure, when an RRC procedure is performed, in order to restore an RLF, an RLF processing procedure in the above-described second RRC signaling structure may be applied.

Figure 15:
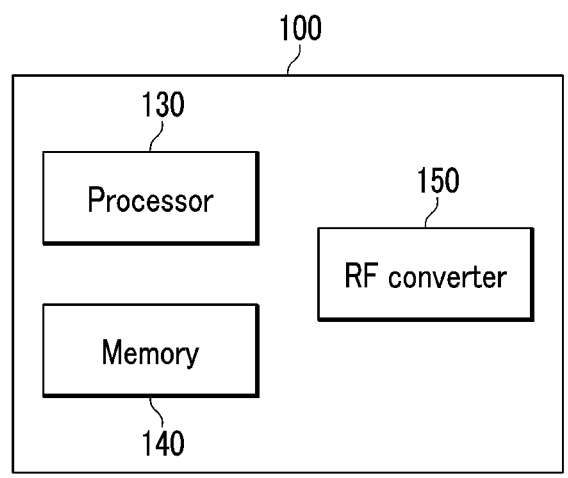
FIG. 15 is a block diagram illustrating a configuration of a terminal according to an exemplary embodiment of the present invention.

FIG. 15 is a block diagram illustrating a configuration of UE 100 according to an exemplary embodiment of the present invention.

The UE 100 includes a processor 130, a memory 140, and a Radio Frequency (RF) converter 150.

The processor 130 may be formed to implement procedures, functions, and methods that are related to the UE 100 that is described with reference to FIGS. 1 to 14.

The memory 140 is connected to the processor 130 and stores various information that is related to operation of the processor 130.

The RF converter 150 is connected to the processor 130 and transmits or receives a wireless signal. The UE 100 may have a single antenna or multiple antennas.

Figure 16:
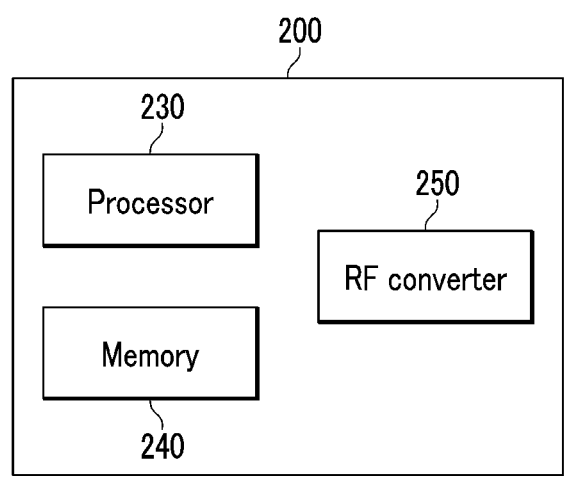
FIG. 16 is a block diagram illustrating a configuration of an MeNB according to an exemplary embodiment of the present invention.

FIG. 16 is a block diagram illustrating a configuration of an MeNB 200 according to an exemplary embodiment of the present invention.

The MeNB 200 includes a processor 230, a memory 240, and an RF converter 250.

The processor 230 may be formed to implement procedures, functions, and methods that are related to the MeNB 200 that is described with reference to FIGS. 1 to 14.

The memory 240 is connected to the processor 230 and stores various information that is related to operation of the processor 230.

The RF converter 250 is connected to the processor 230 and transmits or receives a wireless signal. The MeNB 200 may have a single antenna or multiple antennas.

Figure 17:
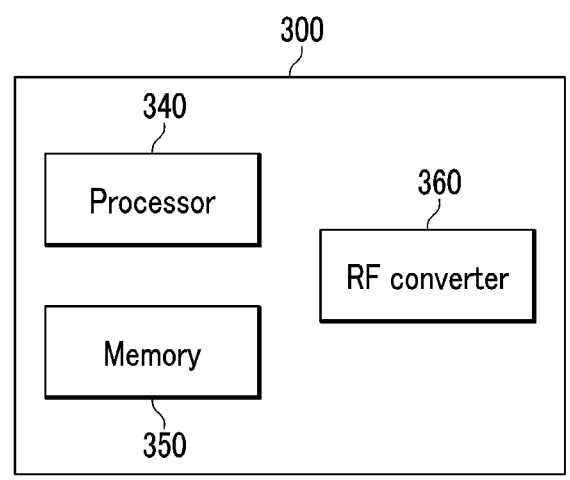
FIG. 17 is a block diagram illustrating a configuration of an SeNB according to an exemplary embodiment of the present invention.

FIG. 17 is a block diagram illustrating a configuration of an SeNB 300 according to an exemplary embodiment of the present invention.

The SeNB 300 includes a processor 340, a memory 350, and an RF converter 360.

The processor 340 may be formed to implement procedures, functions, and methods that are related to the SeNB 300 that is described with reference to FIGS. 1 to 14.

The memory 350 is connected to the processor 340 and stores various information that is related to operation of the processor 340.

The RF converter 360 is connected to the processor 340 and transmits or receives a wireless signal. The SeNB 300 may have a single antenna or multiple antennas.

According to an exemplary embodiment of the present invention, an entire scenario for enhancing a small cell that is considered in a present 3GPP can be supported.

Further, according to an exemplary embodiment of the present invention, RRC signaling can be efficiently performed. Specifically, according to an exemplary embodiment of the present invention, robustness of transmission/reception of an RRC message can be enhanced.

Further, according to an exemplary embodiment of the present invention, RRC diversity can be available and mobility related performance can be improved.

Further, according to an exemplary embodiment of the present invention, processing of a Radio Link Failure (RLF) can be efficiently performed.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A communication method of a terminal having dual connectivity to a first base station and a second base station, the communication method comprising:
   receiving a first Radio Resource Control (RRC) message from the first base station only through a first interface between the first base station and the terminal;
   transmitting a second RRC message to the first base station only through the first interface; and
   releasing remaining bearers, except for a first Signaling Radio Bearer (SRB), when a Radio Link Failure (RLF) is recognized,
   wherein the first SRB is used for transmitting/receiving a message of a Common Control Channel (CCCH) based on a Transparent Mode (TM).

2. The communication method of claim 1, wherein the terminal does not receive the first RRC message from the second base station,
   a user plane protocol of the first base station and a user plane protocol of the second base station support a bearer split function, and
   the user plane protocol of the second base station comprises remaining protocols, except for a Packet Data Convergence Protocol (PDCP) among the PDCP, a Radio Link Control (RLC) protocol, and a Medium Access Control (MAC) protocol.

3. The communication method of claim 2, wherein the first base station is a master base station that performs control and service for the terminal, and the second base station is an auxiliary base station that provides an auxiliary service to the terminal, and
   the receiving of a first RRC message comprises receiving the first RRC message using at least one Signaling Radio Bearer (SRB) that is set through an RRC protocol of the first base station and an RRC protocol of the terminal,
   wherein the at least one SRB comprises:
      the first SRB; and
      at least one second SRB used for transmitting/receiving a message of a Dedicated Control Channel (DCCH) based on an Acknowledgement Mode (AM).

4. The communication method of claim 2, further comprising measuring a cell of the first base station and a cell of the second base station in response to a measurement configuration that is received from the first base station, before the receiving of the first Radio Resource Control (RRC) message.

5. A communication method of a terminal having dual connectivity to a first base station and a second base station, the communication method comprising:
   receiving a measurement configuration from the first base station, the measurement configuration including a measurement procedure for searching for the second base station;
   measuring a quality of a first radio link between the first base station and the terminal and quality of a second radio link between the second base station and the terminal;
   determining whether the measured result corresponds to a report condition that is received from the first base station;
   reporting, when the measured result corresponds to the report condition, the measured result to the first base station;
   receiving a first Radio Resource Control (RRC) message from one of the first base station and the second base station that is selected by the first base station according to the measured result; and
   transmitting a second RRC message to the selected base station.

6. The communication method of claim 5, wherein a user plane protocol of the first base station and a user plane protocol of the second base station support a bearer split function,
   the user plane protocol of the second base station comprises remaining protocols, except for a Packet Data Convergence Protocol (PDCP) among the PDCP, a Radio Link Control (RLC) protocol, and a Medium Access Control (MAC) protocol, and
   only the first base station among the first base station and the second base station comprises an RRC protocol.

7. The communication method of claim 6, wherein the receiving of a first RRC message comprises receiving the first RRC message using a first Signaling Radio Bearer (SRB) that is set by the second base station, and
   wherein the first SRB is the same as a second SRB that is set by the first base station.

8. The communication method of claim 6, wherein the receiving of a first RRC message comprises receiving the first RRC message using a first Signaling Radio Bearer (SRB) that is set by the second base station,
   wherein the first SRB is different from a second SRB that is set by the first base station.

9. The communication method of claim 6, further comprising, before the receiving of the first RRC message,
   measuring a downlink carrier frequency of a cell of at least one of the first base station and the second base station in response to the measurement configuration; and
   performing measurement in order to search for a cell of the second base station in response to the measurement configuration.

10. The communication method of claim 6, further comprising:
    releasing both a Signaling Radio Bearer (SRB) and a Data Radio Bearer (DRB) that are configured by the first base station and the second base station when a Radio Link Failure (RLF) of the first radio link is recognized; and
    re-establishing an RRC connection.

11. The communication method of claim 6, further comprising transmitting a first message that requests RRC connection re-establishment to the second base station, when a Radio Link Failure (RLF) of the first radio link is recognized,
    wherein the first message comprises re-establishment cause information representing an RLF of a cell of the first base station.

12. The communication method of claim 6, further comprising notifying the first base station of a Radio Link Failure (RLF) of the second radio link in order to release a Signaling Radio Bearer (SRB) and a Data Radio Bearer (DRB) that are set for the second base station, when the RLF of the second radio link is recognized.

13. The communication method of claim 6, further comprising releasing both a Signaling Radio Bearer (SRB) and a Data Radio Bearer (DRB) that are set for the first base station and the second base station and re-establishing a RRC connection, when an Radio Link Failure (RLF) of the first radio link and an RLF of the second radio link are recognized.

14. A communication method of a terminal having dual connectivity to a first base station and a second base station, the communication method comprising:
   receiving a measurement configuration from the first base station;
   measuring a downlink carrier frequency of a cell of at least one of the first base station and the second base station in response to the measurement instruction;
   performing measurement in order to search for a cell of the second base station in response to the measurement configuration;
   reporting the measured result to the first base station, when the measured result corresponds to a report condition that is received from the first base station;
   receiving a first Radio Resource Control (RRC) message from the first base station and receiving a second RRC message from the second base station; and
   determining whether the second RRC message is a duplicate of the first RRC message,
   wherein the second RRC message is a duplicate of the first message based on the first base station controlling the second base station to perform simultaneous transmission of a same RRC message.

15. The communication method of claim 14, wherein the determining of whether second RRC message is a duplicate of the first RRC message is performed using a simultaneous transmission parameter that is included in the first RRC message and the second RRC message.

16. The communication method of claim 14, wherein the determining of whether the second RRC message is a duplicate of the first RRC message is performed using a Packet Data Convergence Protocol (PDCP) of the terminal.

17. The communication method of claim 14, wherein the receiving of the first RRC message and the second RRC message is performed using a first Signaling Radio Bearer (SRB) that is set for the first base station and a second SRB that is set for the second base station,
   wherein the first SRB is different from the second SRB.

* * * * *